United States Patent
Heckmann et al.

(10) Patent No.: US 10,421,464 B2
(45) Date of Patent: Sep. 24, 2019

(54) METHOD, SYSTEM AND VEHICLE FOR ANALYZING A RIDER PERFORMANCE

(71) Applicant: HONDA RESEARCH INSTITUTE EUROPE GMBH, Offenbach/Main (DE)

(72) Inventors: Martin Heckmann, Offenbach (DE); Herbert Janssen, Dreieich (DE); Nils Magiera, Frankfurt am Main (DE); Hermann Winner, Bietigheim (DE)

(73) Assignee: HONDA RESEARCH INSTITUTE EUROPE GMBH, Offenbach/Main (DE)

( * ) Notice: Subject to any disclaimer, the term of this patent is extended or adjusted under 35 U.S.C. 154(b) by 252 days.

(21) Appl. No.: 15/440,238

(22) Filed: Feb. 23, 2017

(65) Prior Publication Data
US 2017/0259829 A1 Sep. 14, 2017

(30) Foreign Application Priority Data

Mar. 14, 2016 (EP) .................................. 16160211
Jul. 19, 2016 (EP) .................................. 16180118

(51) Int. Cl.
*B60W 50/14* (2012.01)
*B60W 40/09* (2012.01)
(Continued)

(52) U.S. Cl.
CPC ...... *B60W 50/14* (2013.01); *B60W 30/18145* (2013.01); *B60W 40/09* (2013.01);
(Continued)

(58) Field of Classification Search
CPC ...... B60W 40/10; B60W 40/09; B60W 30/02; B60W 30/18; B60W 50/14
(Continued)

(56) References Cited

U.S. PATENT DOCUMENTS 8,849,474 B2 * 9/2014 Yoneta ..................... B62H 7/00
701/1
2005/0131597 A1 6/2005 Raz et al.
(Continued)

FOREIGN PATENT DOCUMENTS

EP 2 517 952 A1 10/2012
EP 2517952 A1 10/2012

OTHER PUBLICATIONS

Jul. 24, 2017 Extended Search Report issued in European Patent Application No. 16180118.8.

*Primary Examiner* — Thomas G Black
*Assistant Examiner* — Luat T Huynh
(74) *Attorney, Agent, or Firm* — Squire Patton Boggs (US) LLP

(57) ABSTRACT

The invention regards a method, a system and a vehicle for analyzing a rider performance. The vehicle is any vehicle that employs a roll angle change for changing its driving direction. Firstly, physical motion parameters of the vehicle in motion are sensed and the measured data is supplied to computing unit. In the computing unit, segments in a time series of measured data are determined by processing the measured data in the computing unit. Each segment corresponds to a rider control behavior and the plurality of such consecutive rider control behavior build a riding maneuver. In the computing unit, the measured data within one segment for at least one of the segments is analyzed by computing at least one characteristic value for the respective segment and/or the sequence of determined segments is analyzed. Finally, an analysis result indicating the rider performance or rider skills is output.

14 Claims, 2 Drawing Sheets

(51) Int. Cl.
    *B60W 30/18*     (2012.01)
    *G07C 5/08*     (2006.01)

(52) U.S. Cl.
    CPC ... *B60W 2050/146* (2013.01); *B60W 2300/36* (2013.01); *B60W 2520/10* (2013.01); *B60W 2520/14* (2013.01); *B60W 2520/18* (2013.01); *B60W 2550/14* (2013.01); *B60W 2550/20* (2013.01); *B60W 2550/402* (2013.01); *B60W 2750/40* (2013.01); *B62K 2207/02* (2013.01); *G07C 5/085* (2013.01); *G07C 5/0808* (2013.01)

(58) Field of Classification Search
    USPC .......................................................... 701/1
    See application file for complete search history.

(56) References Cited

U.S. PATENT DOCUMENTS

| | | | |
|---|---|---|---|
| 2014/0129113 A1* | 5/2014 | Van Wiemeersch | F02D 28/00 701/102 |
| 2014/0148972 A1* | 5/2014 | Basir | G07C 5/008 701/1 |
| 2014/0277832 A1* | 9/2014 | Bando | G07C 5/00 701/1 |
| 2014/0365029 A1* | 12/2014 | Sugimoto | B60W 40/09 701/1 |
| 2015/0352999 A1* | 12/2015 | Bando | B60K 28/066 340/439 |

\* cited by examiner

METHOD, SYSTEM AND VEHICLE FOR ANALYZING A RIDER PERFORMANCE

BACKGROUND

Field

The invention is related to a method for analyzing a rider performance and a corresponding system and vehicle.

Description of the Related Art

Vehicles that need to be balanced while driving are much more difficult to control compared with for example cars or the like. The reason is that for example two-wheeled vehicles are unstable in a wide speed range. This lack of stability regards all two wheeled vehicles, i.e. a powered two-wheeled vehicle and for example a bicycle. The system that needs to be considered does not only consist of the vehicle itself but also on the human being that controls, balances and stabilizes the vehicle via forces on the steering system but also the rider's body motion and displacement. Thus, the vehicle dynamic and stability of such a system consisting of the human and the machine strongly depend on the rider's capabilities and skills. Since vehicle dynamics and stability directly regard safety of riding such a vehicle it is important that the rider's capabilities are constantly improved. On the other side there are already known assistant systems such as slip control systems that are very helpful for assisting a rider in controlling such vehicle like for example a motorcycle. But of course it makes a big difference if the rider is already very experienced and his control behavior has a high level of skill or if the system shall assist a beginner.

Thus, it is desirable to have knowledge about the skills of the rider currently controlling the vehicle. In the past attempts have been made to determine the rider's skill. For example EP 2 517 952 A1 describes a two-wheeled motor vehicle with a rider characteristic determining apparatus mounted thereon. In order to determine the rider's control characteristics a gyroscope is mounted on the motorcycle. The gyroscope delivers measurement values such as angular speed, and, by integrating angular speed, angles in different directions of yaw, roll and pitch. Also the respective angular rates are measured and the measured values are supplied to a computing unit. On the basis of at least these measured values a turning movement of the vehicle is determined. In order to determine such a turning movement it is analyzed if the yaw rate exceeds a predetermined threshold for at least a particular duration. Then such time interval is considered to correspond to a turning movement of the vehicle. The measured values are then analyzed in this time interval.

One problem of the approach described in EP 2 517 952 A1 is that the analysis that can be made is very limited. In particular the section that is taken into consideration for the analysis comprises a plurality of consecutive different behaviors that have to be performed by the rider. Thus, it is an object of the present invention to improve such rider performance analysis.

SUMMARY

According to the invention an improved analysis can be achieved. The problem is solved with the method, the system and the vehicle as defined in the independent claims.

Contrary to the state of the art the method for analyzing a rider performance determines segments in a time series of measured data, wherein each such segment corresponds to a particular rider control behavior. A plurality of such consecutive rider control behaviors together build a riding maneuver. Thus, even if the skills or the performance of a rider are limited with respect to only a particular behavior that has to be performed when controlling the vehicle, the detection of such critical rider behavior is possible. Furthermore, due to segmentation according to rider control behaviors, the analysis can be adapted to the type of control behavior and hence a more detailed analysis can be achieved. The inventive approach performs a segmentation into rider control behaviors even without segmentation into riding maneuvers. If a rider is driving straight on a road the respective segment is identified as control behavior "going straight". If the vehicle enters a curve, the method will detect a control behavior "lean-in". If the vehicle continues through the curve, the method will identify a control behavior "constant lean". By a sequence of determined control behaviors, a corresponding maneuver can be identified.

A vehicle in the sense of the present invention is every vehicle that employs a roll angle change for changing its driving direction. Examples for such vehicles are motorcycles, bicycles, or the like. Such vehicle is equipped with sensing means that sense physical motion parameters of the vehicle. The sensing means might be for example an inertia measurement unit (IMU). The data delivered from the sensing means are supplied to a computation unit. In the computation unit a series of segments are determined. Each such segment corresponds as already mentioned to a rider control behavior. These rider control behaviors are part of an overall riding maneuver that is performed by the rider by executing a plurality of such behaviors consecutively. For example, while performing a turning movement the rider of a motorcycle at first has to lean in the motorcycle then to drive through the turn with constant (or almost constant) lean angle and in the end of the turning movement he has to bring the motorcycle back again into an upright position (lean out). The lean angle may vary depending on an increase or decrease of the vehicle velocity and a turn shape and therefore deviate from a constant lean angle.

According to the invention then the data segments are analyzed by means of the computer unit so that an analysis result can be output that gives information of the particular skill of the rider concerning that individual rider control behavior. Alternatively it is also possible to analyze a sequence of determined segments that altogether form a riding maneuver. This enables to evaluate the overall performance of the rider for an entire maneuver, even in case that the individual rider control behaviors of the rider, do not reveal any problematic or critical aspect. For example, if the rider during a turning movement, performs two distinct lean in operations, there is a high probability that he misinterpreted the radius of the curve and thus has to correct his lean angle while making the turning movement. Even though in that case the lean in, steady lean angle and lean out segments per se are well performed by the rider, there is room for improvement and thus increasing the safety of the rider and other traffic participants. The method provides the advantage of providing the capability to evaluate the different types of control behaviors individually.

It is advantageous to segment the time series of measured data also according to riding maneuvers in addition to segmenting into plurality of segments that correspond to a respective rider control behavior. For example, the time series of measured data can be segmented according to riding maneuvers first and then at least one riding maneuver is subdivided into a plurality of segments that correspond to a respective rider control behavior. The other way round from the segments according to driving behavior a segment according to a driving maneuver can be derived.

Thus, at first from the measured data like for example the yaw rate or yaw angle it is determined if the vehicle in fact undergoes for example a turning movement. A turning movement of the vehicle is defined as a movement of the vehicle which results in a change in an angular orientation of a vehicle axis i.e. any change in a driving direction of the vehicle, for example when the vehicle is following a road through a road bend or road curve resulting in a change of a yaw angle. It is to be noted that the turning movement is only one example for a plurality of riding maneuvers that might be of interest. Others might be overtaking, lane change, deceleration, an evasion maneuver or the like.

The claimed approach performs a direct segmentation into rider control behaviors. A riding maneuver is determined (identified) in the course of measurement values over time based on the sequence of control behaviors.

If the rider is, for example driving straight on a road, this is identified as control behavior "going straight". If the rider then enters a road curve, the method will detect a control behavior "lean-in" and subsequently a control behavior "constant lean". A riding maneuver can be identified based on a sequence of identified control behaviors. In the given example by the sequential "going straight", "lean-in" and "constant lean".

For all of these riding maneuvers a typical or representative course of control behaviors over time can be defined. On the basis of such course of measurement values that are expected for a specific riding maneuver it is then possible to decide on a riding maneuver being performed.

The analysis of the measured data within one segment is then performed by computing a quality value based on a deviation of a measured data of a segment from a corresponding rider control model. Thereby different segment types can be differentiated in the rider control model. In a phase of constant lean small deviations from the constant lean can be considered as optimal. For each segment type, for example "going straight", "lean-in", "constant lean", etc. different optimal behavior is assumed in the rider control model. Similarly, for a sequence of segments in the analysis a deviation of such sequence of segments from an expected sequence is computed. As mentioned above such deviation of a sequence of segments might be recognized if two distinct lean in phases can be recognized successively. In case that for example the road does not reveal a curve with varying radius, a deviation from the ideal turning movement comprising only one lean in phase, a steady lean angle phase and one lean out phase can be determined. In case of determining a quality value based on deviation of measured data within a single segment there is a plurality of approaches possible. Either mathematical functions that explicitly define a model for the assessed behavior is used or the model might be implicitly learned in an unsupervised or supervised training stage. A deviation of the real course of the measured values from corresponding values according to the model is then used as a quality value describing the skill of the rider. This can also be called a skill score.

In order to provide the rider with an immediate feedback, it is advantageous to present or display the analysis result on a vehicle mounted display. Alternatively, and in particular suitable for training courses having an instructor, the analysis result might be transferred or transmitted to a remote display. Thus, an instructor may have a display and for example the analysis results for a plurality of riders in a training group can all be displayed to the instructor. Displaying the analysis result, either on a vehicle mounted display or on a remote display, preferably is performed immediately after finishing the analysis computation. In particular if the display is mounted on the vehicle, the riders then can immediately associate the analysis result with their riding control. As the just finished control behavior is still within the memory of the riders, this might be the best way to give a feedback based on which the skills of the rider can be improved.

Furthermore, it is advantageous to display the analysis result in an overlaid manner onto a map of the riding course or video of the ride. Since it is always difficult for a rider to precisely remember the details of the ride, this assists him in recognizing where a critical behavior started or what the reason was.

Furthermore, it is advantageous to provide summary statistics for the analysis result, location of occurrence of the behavior and/or frequency of the behavior. Such statistics allow showing, for example, an improvement in behavior in the riding skill or the performance of the rider and thus, motivates the rider to further improve.

According to another advantageous aspect, the analysis of the measured data is not based on the measured data of the physical motion parameters of the vehicles only, but also takes into consideration environmental influences. Thus, if for example, behavior of other traffic participants, road or weather conditions or the like render a reaction of the driver necessary, this might result in measured physical motion parameters that do not correspond to an optimal behavior of the rider control behavior and thus such identified rider behavior may be determined as being critical. But taking into consideration such environmental influences allows isolating such measured values so that the analysis is not negatively affected by such environmental influences. The respective behavior will not be determined as being critical. One approach to take into consideration such environmental influences is to not use measured data in the analysis if a relationship between an environmental influence and occurrence of outliers of measured values can be identified. Alternatively, only the output of this particular analysis result could be suppressed.

The environmental influences preferably are determined on the basis of information from at least one environment observation sensor, information of turning unit and vehicle system sensor. An example for an environment observation sensor is a radar system, LIDAR system or the like that is capable of perceiving the surrounding of the vehicle and thus allows computation of trajectories and prediction of future movement behavior of other traffic participants like vehicles or pedestrians. On the other side, an information obtaining unit, for example being an element of a vehicle to x-communication (V2X) can directly receive information from other traffic participants. Finally, additional vehicle system sensors, like for example sensors of an anti-blocking system for the brakes, throttle position sensor or the like could be taken into consideration. Of course, alternatively the results of processing these sensor's data could be used. An example is vehicle speed computed in an ABS-system.

According to other aspects, the segmentation is performed on basis of a comparison of measured data with prototypical trajectories or probabilistic graphical models or a Hidden Markov Model.

The analysis result is then preferably supplied to an advantaged rider assistance system and the advanced rider assistance system adjusts at least one of its parameters on the basis of the analysis result. This allows optimizing an advanced rider assistance system with respect to the skills or performance of the rider. Thus, for example, a traction control system that avoids wheel slip of a driven wheel could use different levels that give the advanced rider the possibility to more dynamically accelerate at the end of a turn, because more wheel slip is allowed for him. On the other side, in order to be on the safe side for a beginner, the parameters of such traction control system can be set so that in any case wheel slip of the driven wheel is avoided.

The vehicle in particular may be a two-wheeled vehicle such as a motorcycle or a bike.

BRIEF DESCRIPTION OF THE DRAWINGS

The method, system and vehicle will now be described with reference to the annexed drawings in which.

DETAILED DESCRIPTION

Figure 1:
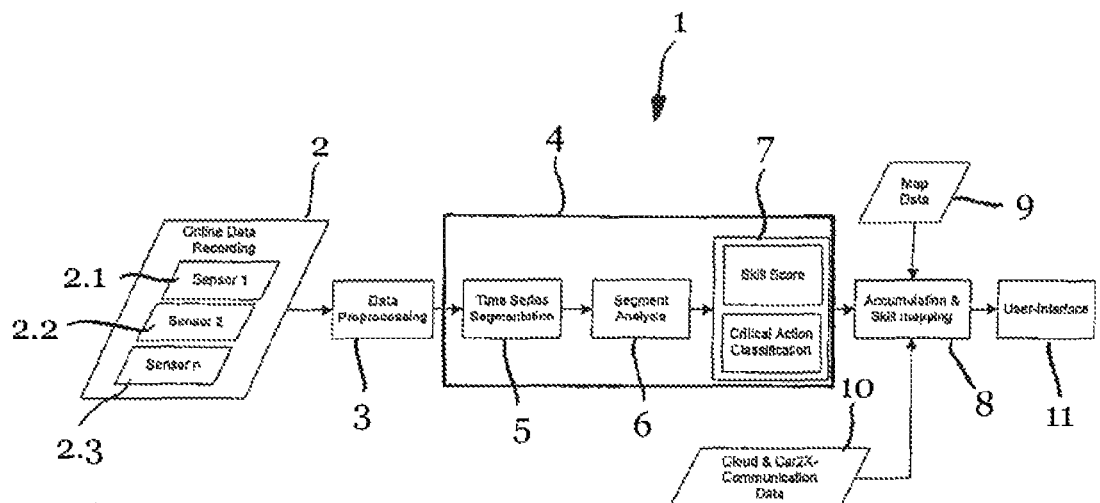
FIG. 1 shows an overall structure of the system for performing the inventive method.

In FIG. 1 there is shown a block diagram illustrating the different stages of processing measured data in a system 1 according to the present invention. The system 1 allows analysis of a rider performance of a vehicle such as a motorcycle or a bike or any other vehicle that employs leaning as means of control as it is typical for two-wheeled vehicles.

The system comprises sensing means 2 that deliver a time series of measurement values of physical motion parameters of the vehicle. These comprise in particular position, velocity, acceleration, angular displacement, angular velocity and angular acceleration. The sensing means 2 may comprise a plurality of individual sensors 2.1, 2.2, 2.3, . . . . The sensors can be elements of an inertia measurement unit (IMU), wherein such IMU in particular already exists if the vehicle comprises a navigation system. Furthermore, secondary sources for measurement data can be mounted on the vehicle. Such secondary sources may be additional sensors like sensors of an anti blocking brake system of the vehicle or outputs from a brake processing ECU. Data that is delivered from such a brake ECU may be for example vehicle speed, brake pressure or the like. Other units of the further also an engine ECU in case of a powered two-wheeled vehicle can be used to obtain data that is used for a further processing. Such an engine ECU may deliver information about a throttle position, an engaged gear or the like.

All the data that is obtained as summarized by the sensing means 2 is then fed to a preprocessing unit 3. In a preprocessing unit 3 a low pass filter is applied to the measurement data in order to remove high frequency components that would rather disturb the further processing and analysis of the measurement data. Thus, it is assumed that above a predetermined frequency threshold that data do not reflect a rider control but such frequency components stem from vehicle vibrations and other sources. In order to get rid of the effects that are irrelevant for analyzing when determining a rider performance a low pass filter is included in the pre-processing unit 3. The low pass filtered measurement values are then supplied to a computing unit 4 for further processing. It is to be noted that from the measurement data after filtering also a driven road curvature is calculated.

In the computing unit the preprocessed measurement data (to be more precise a time sequence of the preprocessed measurement data) is supplied to a segmentation section 5. In the segmentation section according to the invention the time series of measured data is segmented such that each segment corresponds to a particular rider control behavior. A plurality of consecutive rider control behaviors build a riding maneuver as it is now explained with reference to FIG. 2.

Figure 2:
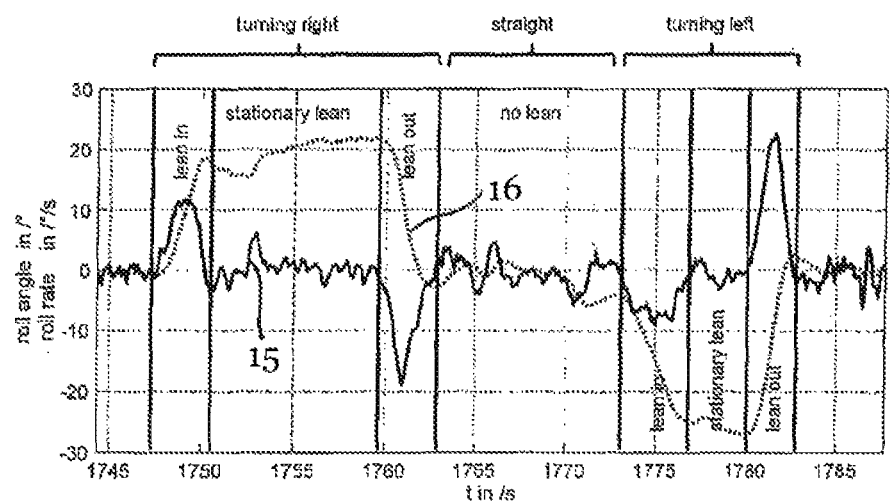
FIG. 2 an exemplary illustration for one physical motion parameter of the vehicle for explaining the segmenting of the measured data.

FIG. 2 shows as examples for measured values a roll angle and roll rate. It is to be noted that the measured values as shown in the figures are already pre-processed by the pre-processing unit 3. Graph 15 shows the roll rate and the dotted line of graph 16 the corresponding roll angle. It can be recognized that over the illustrated time interval three distinct riding maneuvers can be identified. At first a turning movement to the right as indicated above the diagram can be determined followed by straight driving again followed by a turning movement to the left. As it can be seen from the roll angle during the straight driving the roll angle is approximately zero. Thus, riding maneuvers like a turning movement to either side usually are separated by a phase of straight driving. But as it can be seen in FIG. 2 as well the turning movement (either to the right or to the left) can be further divided into segments that correspond to a specific rider control behavior. Examples for such rider control behavior are a lean in phase, a stationary lean and a lean out phase at the end of the turning movement. According to the invention in the computing unit 4 and here in particular in the segmentation section 5, these segments are determined on the basis of the time series of measured data.

It is further to be noted that of course the turning movement is only one example for a riding maneuver and the herewith described approach can be adapted to other riding maneuvers like overtaking, evasion, braking, accelerating, lane change or the like.

For performing the segmentation a plurality of algorithms can be applied. All of these algorithms can exploit the information included in the time series of measurement values of roll and yaw angle, roll and yaw rate, roll acceleration, vehicle speed and vehicle acceleration. It is not necessary that all of these measured data are in fact processed in identified maneuver situation.

A first example for an algorithm used in the segmentation of the measured (and preprocessed) values is use of explicit rule based models. As mentioned above already, for a particular rider control behavior a template function representing such typical rider control behavior can be used. Then a correlation between the in fact measured values and such mathematical template function is made. For the example of a lean-in phase the sigmoid function may be used for the roll angle. Of course it is possible to use a plurality of mathematical template functions to make the result more robust. The correlation is performed for a sliding window and the window for which the best correlation can be recognized is used to define one segment. It is to be noted that not only the position of the sliding window is varied when performing the correlation, but also in addition the window size. Thus, when the best correlation coefficient is found for a particular window position and a particular window size, the boundaries for the segment have been found.

On the basis of the mathematical template functions for which the best correlation was achieved, the segments are classified. Thus, if a high correlation is found for the sigmoid function for the roll angle, it is concluded that this has to correspond to a lean-in phase.

It is furthermore to be noted that also the sequence of segments of particular rider control behavior may be used in order to classify the determined segment.

According to an alternative approach a discrete Hidden Markov Model with explicit features may be used. Such discrete Hidden Markov Model is trained in an unsupervised fashion preferably. It substitutes the explicit rules as mentioned with the first example. The discrete Hidden Markov Model according to this approach is supplied with discrete values of the correlation with the template functions of the first algorithm. But the segmentation and classification in the end is processed using the Hidden Markov Model and the Viterbi-algorithm for calculating segment boundaries and also for identifying the type of rider control behavior of the respective segment.

Further, it is possible to use a Gaussian Mixture Model-Hidden Markov Model. This is advantageous in particular in case that discretization of raw measurement data shall be avoided. If such continuous available measurement data is to be used, the Gaussian mixture model is learned instead of processing discretized raw measurement data. Again the segmentation itself and the classification is processed using such Gaussian Mixture Model-Hidden Markov Model and the Viterbi algorithm.

Both examples for the Hidden Markov Model can be extended assuming that each type of segment is a node representing a hidden state in the Hidden Markov Model and has an explicit time duration distribution.

It is to be noted that the models itself that are used for the segmentation like the Hidden Markov Model per se are known in the art. Thus, details of the mathematics behind the algorithms are omitted.

After having defined boundaries and the type of the segments, the analysis is carried out. In such analysis 6 there are used in principle two approaches to analyze the segments:
a) Each of the segments is analyzed individually and/or
b) the sequence of segments that can be identified is analyzed.

When analyzing the segments individually, it is basically determined if the course of the measured values corresponds to a more or less ideal model for the respective rider control behavior. The rider behavior is therefore modeled and such model can be defined explicitly by a mathematical function or can be explicitly learned in unsupervised or supervised training stage.

Such model for the rider control behavior and the measured values are then compared to each other. As a result, a deviation between the model and the measured data can be determined and based thereon a skill score is calculated. In general, the skill score is a measure allowing drawing a conclusion with respect to the driver's skills or performance.

If for example, the segment corresponds to a stationary lean phase of a turning movement, a simple skill score can be defined by a standard deviation of the roll rate. This is because the ideal roll rate during a stationary lean phase is zero and the closer a good rider comes to a roll rate being zero the higher his score can be assumed. The standard deviation of such ideal roll rate can be used as a simple skill score.

The good rider will have a consistent behavior in each traffic situation thus in different segments describing different control behaviors. The overall skill of a driver can thus be derived from the distribution of segment specific scores. Thus, at first statistic measures are used to describe the consistency of the rider's control behavior. Such statistic measures may be a mean or variance of the specific scores. Secondly, outliers can be used as an efficient indicator for critical situations. Such outliers on the other side can be ignored in order to make the measure for the consistency of the driver control behavior more robust.

Then, a combination of the variation of the skill scores without considering such outliers and the relative numbers of the outliers can be used in order to calculate a total skill score.

This total skill score is computed in a skill score section 7 of the computing unit 4. Alternatively, the sequence of segments itself can be analyzed. Every riding maneuver consists of a typical sequence of rider control behaviors. If a deviation from such typical sequence of rider control behavior lying above a predetermined threshold can be recognized by the segment analysis 6 from the real measured data, a critical control of the rider behavior can be concluded. This can be for example the case if two lean in phases in a single turning movement can be identified. Thus, similar to the segment stability itself, it is possible to identify critical actions by a skill score that uses a confidence measure such as likelihood computed from the Hidden Markov Model. Implicitly, this confidence measure considers both, the segment length and the segment sequence.

Furthermore, in the skill score calculation unit 7 detection and classification of critical actions is performed. This detection and classification of critical actions is performed on the basis of the segment analysis 6 as explained above and can be performed by different means. For example deviations from the normal behavior can be detected or from an unsupervised clustering or the training of a classifier based on annotated training data can be deployed.

In an accumulation and skill mapping unit 8 also additional data can be used to improve the evaluation of the rider skill and to make it more robust by avoiding false positive decisions for a critical behavior. In particular the influence of the environment including also other traffic participants and their behavior can be taken into account. In order to achieve that map data 9 can be used for example. Such map data for example can deliver information about a curve radius and road shape. Other information 10 may be derived from a cloud storage server connected via internet where road bumps, potholes or the like are stored. But also onboard detection systems or V2X communication may provide information that can be exploited. Such information may be the position and speed of other traffic participants. Thus, it is possible to identify a particular rider behavior such as sudden braking or evasive maneuvers as being a reaction to external factors. Consequently these rider actions do not have to be determined as a result of low riding skills. Thus, in case that the evaluation in the skill calculation unit 7 shows a low rider skill it is determined if the behavior in fact is an outcome of a low rider skill or if it is a reaction that was necessary. In that case the particular rider control behavior is not considered as being critical behavior and in the output of the analysis result it is ignored.

After performing such correction the result of the analysis is shown to the rider on a user interface 11 that can be for example a vehicle mounted display. Alternatively the result can also be output on a display of an instructor. In that case the analysis result needs to be transmitted from the vehicle to the display that can be held by an instructor for example.

Figure 3:
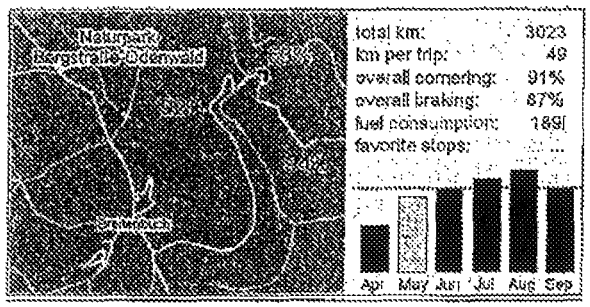
FIG. 3 an example for displaying the analysis result.

There are different ways of providing the analysis result to the driver or the instructor. One example of a display is shown in FIG. 3. Here a section of a map is shown that can be shown. In the map the route driven by the vehicle can be marked in different colors. Each color being a code for the analysis result. In order to reduce the amount of information that has to be considered by the rider during driving, it is advantageous to mark only those sections that show critical rider actions. Furthermore, as shown on the right side of the display, statistics that accumulate scores over a longer timeframe can be given. Thus, it is possible for the driver to receive a feedback on his skill improvement over time.

Figure 4:
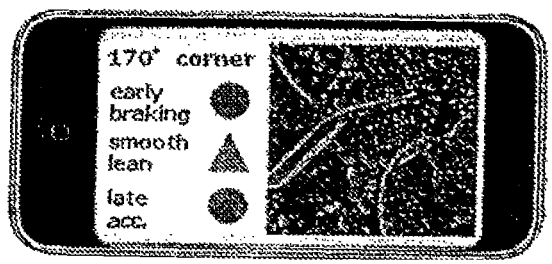
FIG. 4 a further example for displaying the analysis result.

Another example for a display is shown in FIG. 4 which is especially suitable for real time display. As it is shown, the display can also be output on a smartphone. Such real time display is particularly useful for giving a direct feedback to the driver with a reduced information amount which is in the present case limited to only the last riding maneuver. As indicated in the drawing here for example easy to grasp marks like circles, arrows up and arrows down can be used to indicate average skill, better than average, or worse than average.

Figure 5:
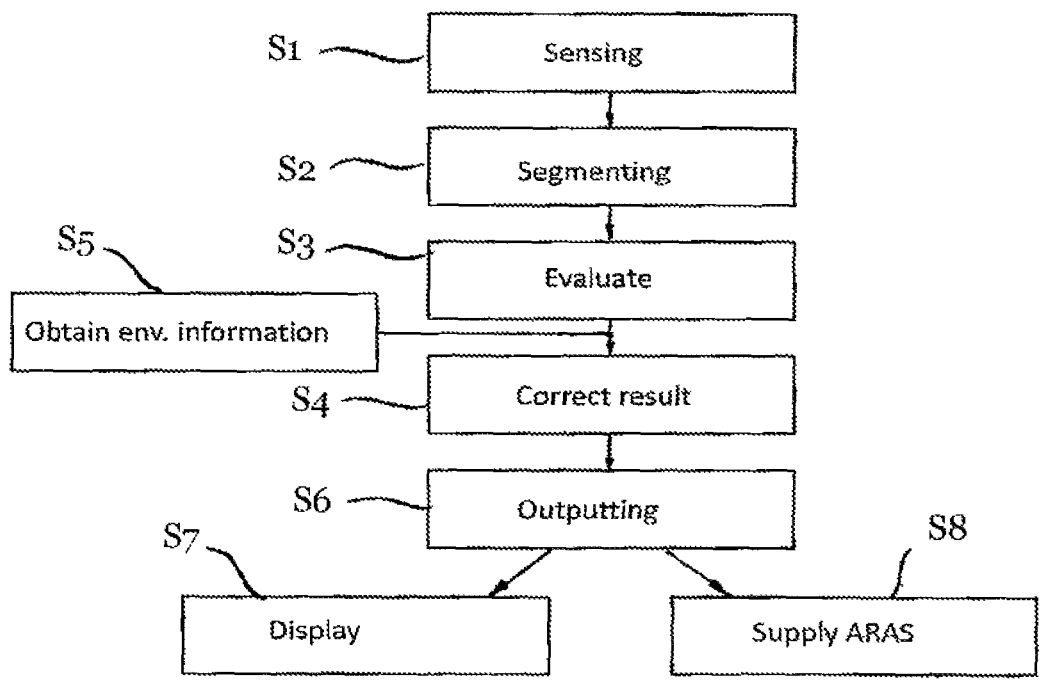
FIG. 5 a flowchart illustrating the main method steps.

In FIG. 5 there is a simplified flowchart illustrating the main steps of the inventive method.

At first physical motion parameters of the vehicle are sensed in step S1. After preprocessing the sensed parameters explained above, a segmentation of the measured data is performed in step S2 and thereafter an analysis of the sequence of segments and/or the measured data within the segments is performed in step S3.

Since the evaluation of the measured data might incorrectly denote that a critical action or critical rider control behavior was executed by the driver, a correction of the analysis result is performed in step S4. In order to perform such correction, information about environmental influences is obtained as indicated in step S5. After correcting the analysis output or the analysis result, the corrected result is output in step S6. Such outputting of the corrected results can either be used to display directly the information on the driver's performance and skills as described above. Alternatively, the results can be used to improve the algorithms of an advanced rider's assistance system in step S8. In such rider assistance system the parameters used for the algorithms used for the advanced rider assistance systems can be adapted as a response to the determined rider's skill or rider's performance.

As it has been mentioned before, the inventive method and system is not limited to wheeled vehicle, but is applicable to every vehicle that needs a change of roll angles for control.

Furthermore, it is also possible to use as a display for example a head-up display (HUD) which can even be included into a visor of a rider's helmet. The data may also be stored for later further analysis on a remote computer device so that the measured data or only the evaluation result can be transferred to a remote computing unit. In particular, for use in such remote system it is advantageous to log the measured data and/or the analysis results so that statistics over a longer time or a plurality of rides can be made.

The invention claimed is:

1. Method for analyzing rider performance of riding a vehicle that employs a roll angle change for changing its driving direction, the method comprising:
   measuring physical motion parameters including a roll angle and/or roll angle change of the vehicle in motion by sensing means and generating measured data of the measured physical motion parameters,
   supplying the measured data to a computation unit,
   determining segments in a time series of measured data by processing the measured data in the computation unit, wherein each segment corresponds to a rider control behavior and a plurality of consecutive rider control behaviors build a riding maneuver,
   analyzing in the computing unit the measured data within one segment for at least one of the segments by computing at least one quality value for the respective segment, or analyzing a quality value of the sequence of determined segments, and
   outputting an analysis result based on the quality value, and wherein
   the analysis result is displayed on a vehicle mounted display and/or transferred to a remote display, preferably immediately after finishing the analysis computation.

2. Method according to claim 1, wherein
the time series of measured data is further segmented according to riding maneuvers and at least one such segment is subdivided into the segments corresponding to respective rider control behaviors.

3. Method according to claim 1, wherein
the analysis is performed by computing a quality value based on a deviation of the measured data of a segment from a corresponding rider control model or computing a deviation of a sequence of segments belonging to one riding maneuver from a model sequence for such riding maneuver.

4. Method according to claim 3, wherein
the analysis result is displayed in an overlaid manner onto a map of the riding course or a video of the ride.

5. Method according to claim 1, wherein
a summary statistic for the analysis result, location of occurrence of the behavior or frequency of the behavior is generated.

6. Method according to claim 1, wherein
a summary score for at least one riding behavior or riding maneuver is generated.

7. Method according to claim 1, wherein
in the analysis of the measured data environmental influences are taken into consideration.

8. Method according claim 7, wherein
environmental influences are determined on the basis of information from one or a plurality of at least one environment observation sensor, information obtaining unit and vehicle system sensor.

9. Method according to claim 1, wherein
segmentation is performed on the basis of a comparison of measured data with prototypical trajectories.

10. Method according to claim 1, wherein
segmentation is performed on the basis of a probabilistic graphical model or a Hidden Markov Model.

11. Method according to claim 1, wherein
the analysis result is supplied to an advanced rider assistance system and the advanced rider assistance systems adjusts at least one of its parameters on the basis of the analysis result.

12. System for analyzing rider performance, the system comprising sensing means for sensing physical motion parameters including a roll angle and/or roll angle change of a vehicle in motion and a computing unit configured to perform the method steps of claim 1.

13. Vehicle including the system of claim 12.

14. Vehicle according to claim 13,
further comprising an advanced rider assistance system configured to adjust at least one parameter on the basis of an output of the system for analyzing a rider performance.

* * * * *